United States Patent [19]

Bigo

[11] Patent Number: 5,911,015
[45] Date of Patent: Jun. 8, 1999

[54] POLARIZATION-INDEPENDENT KERR MODULATOR, AND AN ALL-OPTICAL CLOCK RECOVERY CIRCUIT INCLUDING SUCH A MODULATOR

[75] Inventor: Sébastien Bigo, Palaiseau, France

[73] Assignee: Alcatel N.V., Rijswijk, Netherlands

[21] Appl. No.: 08/787,011

[22] Filed: Jan. 29, 1997

[30] Foreign Application Priority Data

Jan. 30, 1996 [FR] France ................................ 96 01082

[51] Int. Cl.⁶ .................................................. G02F 1/07
[52] U.S. Cl. ................................ 385/1; 385/15; 385/24
[58] Field of Search ............................... 385/1–3, 11, 15, 385/24, 27; 356/350

[56] References Cited

U.S. PATENT DOCUMENTS

| | | | |
|---|---|---|---|
| 4,997,282 | 3/1991 | Pavlath .................................. | 356/350 |
| 5,078,464 | 1/1992 | Islam .................................... | 385/1 X |
| 5,471,545 | 11/1995 | Negami et al. ....................... | 385/1 |
| 5,471,546 | 11/1995 | Meier .................................... | 385/11 |
| 5,473,457 | 12/1995 | Ono ....................................... | 385/11 X |
| 5,757,529 | 5/1998 | Desurvire et al. .................... | 359/179 |

OTHER PUBLICATIONS

J. D. Moores et al, "Optical Switching Using Fiber Ring Reflectors", *Journal of the Optical Society of America—B*, vol. 8, No. 3, Mar. 1, 1991, pp. 594–601.

D. Sandel et al, "Polarization–independent regenerator with nonlinear optoelectronic phase–locked loop", *OFC '94 Optical Fiber Communications*, vol. 4, 1994, Technical Digest Series, Conference Edition (IEEE Cat. No. 94CH3422-3) 1994–Conference on Optical Fiber Communication, Feb. 20–25, 1994, ISBN 1–55752–321–5, 1994, Washington, DC., Optical Society of America, pp. 310–311.

J. K. Lucek et al, "All Optical Signal Regenerator", *Optics Letters*, vol. 18, No. 15, Aug. 1, 1993, pp. 1226–1228.

*Primary Examiner*—John D. Lee
*Attorney, Agent, or Firm*—Sughrue, Mion, Zinn, Macpeak & Seas, PLLC

[57] ABSTRACT

The invention relates to a Kerr type optical modulator and to an all-optical clock recovery circuit operating by active mode locking of a fiber loop laser including such a modulator. Operation is independent of the polarization of the signals presented to the signal input, at wavelength $\lambda_s$. The wavelength of the clock signal delivered by the clock recovery circuit is $\lambda_c$. The modulator comprises an even number of segments, and in a preferred embodiment four segments of polarizationmaintaining fiber, with the segments being of equivalent optical lengths, and interconnected by three splices at three locations. At the first and third splices, the neutral propagation axes of the polarization-maintaining fiber are turned through 90°. In an advantageous variant of the invention, a mode converter is inserted in the loop at the second splice, the mode converter comprising an optical demultiplexer and an optical multiplexer together with two polarization-maintaining optical paths interconnecting them. The demultiplexer separates the two different-wavelength optical signals present in the loop of the fiber laser and applies them respectively to said two paths. A splice including 90° rotation of the neutral axes of the polarization-maintaining fibers is made on the path conveying the input signal at wavelength $\lambda_s$. On the other path, there is no rotation of the axes. The multiplexer then recombines the two signals. The invention is applicable to long distance telecommunications via optical fiber.

15 Claims, 3 Drawing Sheets

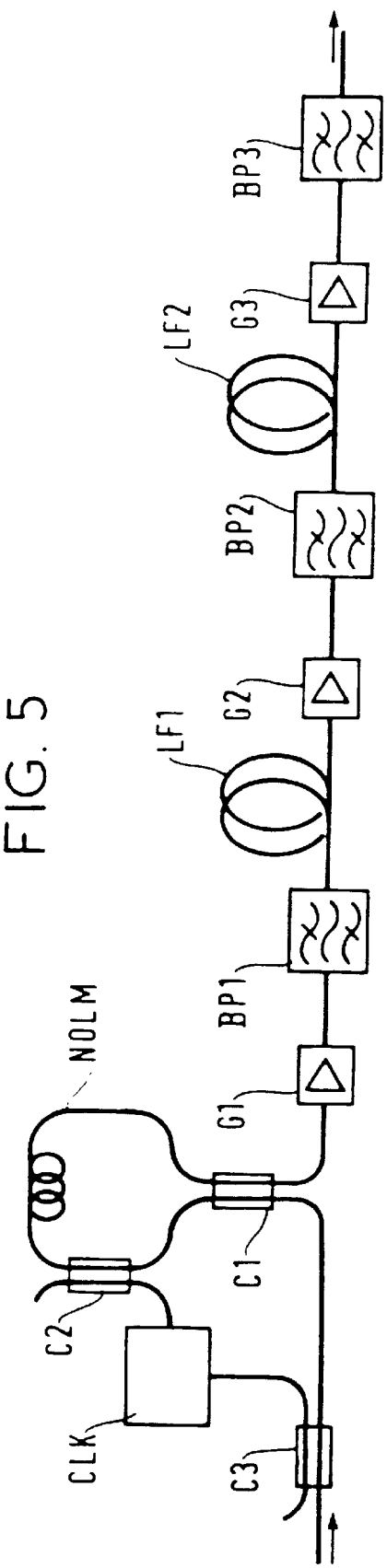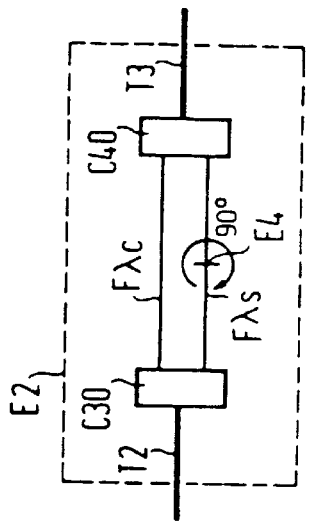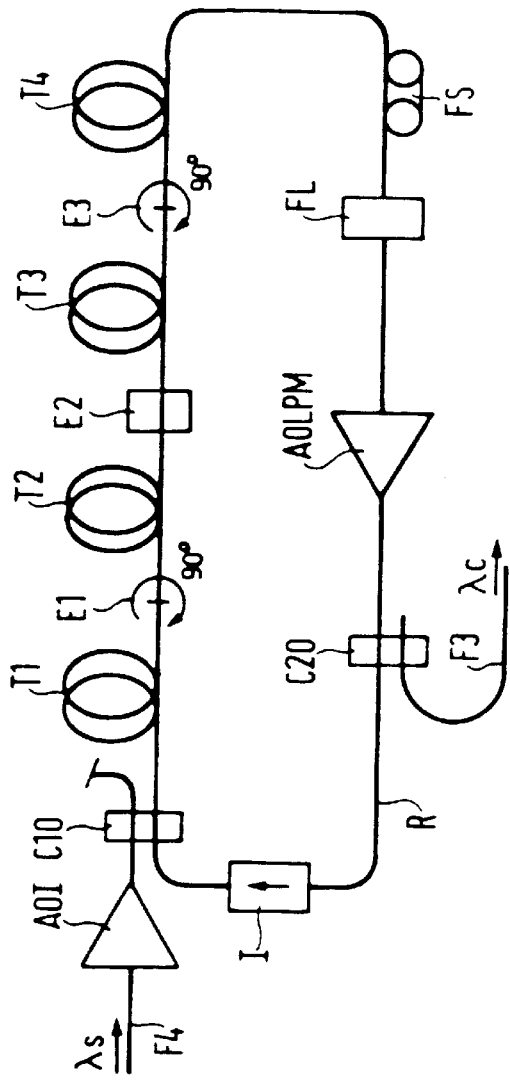

POLARIZATION-INDEPENDENT KERR MODULATOR, AND AN ALL-OPTICAL CLOCK RECOVERY CIRCUIT INCLUDING SUCH A MODULATOR

The invention relates to the field of processing optical signals, e.g. travelling within an optical telecommunications system. More precisely, the invention relates to a Kerr type optical modulator and to an all-optical circuit for clock recovery by actively locking the modes of a fiber loop laser, with both the modulator and the circuit being polarization-independent. Such a circuit can be used for demodulation or for regeneration by synchronous modulation of high data rate optical signals.

BACKGROUND OF THE INVENTION

The person skilled in the art knows numerous all-optical clock recovery circuits, and in particular those operating by actively locking the modes of a fiber loop laser. Laser mode locking relies on the Kerr effect which takes place in the optical fiber loop when signal light is injected into the loop at sufficient intensity to give rise to the Kerr effect. In those prior art circuits, operation is polarization-independent since prior art circuits are made using an optical fiber that is not polarization dispersive; the effects of polarization are thus averaged out and they cancel. In contrast, those embodiments are highly sensitive to their environment (temperature, vibration, humidity, etc.), thereby restricting practical application thereof.

All-optical clock recovery by active locking of a fiber loop laser is described, for example, in document D1=French patent application FR 94/15555 of Dec. 23, 1994, in the name of Alcatel N. V., and entitled "Disposition de régénération en ligne d'un signal transmis par solitons via la modulation synchrone des solitons á l'aide d'un miroir optique non-linéaire" [Apparatus for in-line regeneration of a signal transmitted by solitons, making use of synchronous modulation of the solitons by means of a non-linear optical mirror] corresponding to U.S. Pat. No. 5,757,529. That document D1 (still not published at the priority date of the present application) is, in the opinion of the Applicant, the closest document in the prior art for understanding the contribution of the present invention, and its contents is expressly incorporated in the present application.

The apparatus described in D1 performs in-line soliton regeneration by synchronous modulation of the solitons by using a non-linear optical loop mirror (NOLM) as an optical modulator, the NOLM modulator being controlled by a clock signal recovered from the soliton signal by clock recovery means which, in a particular embodiment, are all-optical means, e.g. by locking the modes of a fiber loop laser. The laser has an input coupler (C3, C7, C10) which may be a 50/50 coupler or else an asymmetrical coupler. In a particular embodiment, the clock recovery system further includes one or more optical amplifiers and a bandpass filter at the output. As in the present invention, the intended application is optical telecommunications over long distances, in particular by means of solitons.

Like document D3 described below, Document D1 teaches the use of optical clock recovery by locking the modes of a fiber ring laser, but in a fiber laser which does not have polarization dispersion, and therefore its operation is independent of the polarization of the input signal.

Other documents are useful for better understanding of the present invention, and are introduced briefly with a summary of their contribution for this purpose. These documents are also expressly incorporated in the present application as descriptions of the prior art:

D2=N. Finlayson et al. (1992), "Switch inversion and polarization sensitivity of the non-linear optical loop mirror (NOLM)", Optics Lett., Vol. 17, No. 2, pp. 112–114, Jan. 15, 1992. That document teaches that a non-linear loop mirror (NOLM) can be organized as a switch which is little if at all sensitive to the polarization of the light signal to be switched while operating under linear conditions, and that the birefringence of the loop can contribute to the instabilities observed in mode-locked ring lasers.

D3=J. K. Lucek and K. Smith (1993), "All-optical signal regenerator", Opt. Lett., Vol. 18, No. 15, pp. 1226–1228, Aug. 1, 1993, expressly incorporated in the present application as a description of the prior art.

The system known from D3 is shown in FIG. 1 and uses a non-linear optical loop mirror (NOLM) for modulating a clock signal at a first wavelength $\lambda_h=1.56$ $\mu$m with the bit train of a signal to be regenerated, said signal being at a second wavelength $\lambda_s=1.54$ $\mu$m. The clock signal modulated in this way thus constitutes the regenerated signal which has thus changed wavelength (1.56 $\mu$m on output instead of 1.54 $\mu$m on input).

According to the teaching of that document, the clock signal is recovered from the signal injected on the input fiber F1 by locking the modes of a fiber ring laser RL to generate a train of clock pulses at the bit rate of the signal, with jitter being reduced by the laser mode locking. The length of the laser cavity can be adjusted by means of a device FS for mechanically adjusting transit time to be an integer multiple of the space occupied by one bit in the ring. The device FS is controlled by control means (not shown) which act by feedback to maintain the length of the ring constant. The birefringent devices for polarization control PC are adjusted to minimize the effects of polarization in the ring, which effects tend to reduce laser efficiency.

The clock pulse train is extracted from the ring laser by coupler C6, from which it transits via an optical isolator I and a mechanical device for adjusting transit time FS prior to being injected into input 1 of the coupler C1 of the NOLM. The input signal $\lambda_s=1.54$ $\mu$m is injected into the loop L of the NOLM by the input fiber F3 via the coupler C2. The birefringent devices for controlling polarization PC are adjusted to make the NOLM fully reflective for a clock signal present on the input 1 of the coupler C1 (reflecting towards the input 1) and in the absence of an input soliton signal on the coupler C2. In contrast, when a "1" bit of the signal is injected into the NOLM via the coupler C2, it performs switching that allows the clock signal to pass, which signal then leaves the output fiber F2 via the output 2 of the coupler C1, without time jitter.

The NOLM is thus used as a switch controlled by the bits of the signal to be regenerated, serving to switch the clock signal "on" when the signal bit is "1" (the NOLM is then transparent to the clock signal), and "off" when the signal bit is "0" (the NOLM then reflects the clock signal).

The time window of the signal bit constituting the switch control of the NOLM is larger than that of the clock signal to ensure insensitivity to jitter in the signal to be regenerated (see p. 1227, lefthand column, last paragraph of D3). This is accomplished by using relative "slip" between the signal injected via C2 and the clock signal in the co-propagation direction (clockwise in the figure) due to the chromatic dispersion between the two wavelengths used, with this phenomenon being known as "walk-off".

The system proposed by Lucek and Smith is not the most appropriate for recovering the clock from a train of solitons, for several reasons, and in particular because the polarization control devices (ref. PC in FIG. 1 of D3) need to be adjusted to minimize the effects of polarization in the ring which tend to reduce laser efficiency, while said adjustment needs to be monitored since it depends on environmental parameters (temperature, vibration, . . . ).

The operating reliability of such apparatus on site would appear to be far from satisfactory with respect to these problems.

The document already published at the priority date of the present application and considered by the Applicant as being the closest published document in the prior art is D4=K. Smith and J. K Lucek (1992), "All-optical clock recovery using a mode locked laser", Elect. Lett., 28(19), p. 1814, Sep. 10, 1992. That document describes all-optical recovery of a clock from a soliton signal by mode locking an optical fiber ring laser with said soliton signal being injected into the ring. The apparatus of D4 suffers from the same drawbacks as the apparatus of D3, and for the same reasons.

D5=L. E. Adams et al. (1994), "All-optical clock recovery using a mode-locked figure-eight laser with a semiconductor non-linearity", Electron. Lett., Vol. 30, No. 20, pp. 1696–1697, Sep. 29, 1994. That document teaches another embodiment of a mode-locked laser for all-optical clock recovery.

D6=Uchiyama et al. (1995), "Polarization-independent wavelength-conversion using non-linear optical-loop mirror", Elect. Lett., 31 (21), p. 1862, Oct. 12, 1995 describes a system for converting the wavelength of an optical signal of undetermined polarization applied to the control input of a NOLM as described below with reference to FIG. 2. To make the performance of that apparatus independent of the polarization of the optical signal whose wavelength is to be converted, the NOLM is made out of a polarization-maintaining fiber as in D7 below, and the clock signal is injected to the input of the coupler C1 with polarization at 45° relative to the two neutral axes of the NOLM loop.

D7=K. Uchiyama et al. (1992), "Ultrafast polarization-independent all-optical switching using a polarization diversity scheme in the non-linear optical loop mirror (NOLM)", Electron. Lett., Vol. 28, No. 20, pp. 1864–1866, Sep. 24, 1992. That document shows the use of a NOLM as a switch, which switch is made insensitive to the polarization of the light of the signal to be switched. This is achieved by using a polarization-maintaining fiber that is cut and rotated through 90° at the midpoint of the NOLM loop. The principle is shown in FIG. 2.

By way of example, the NOLM loop is constituted by a two-hole PANDA polarization-maintaining fiber. By performing 90° rotation between the axis A1 and the axis A2 at the propagation halfway point, the fast axis in the lefthand portion becomes the slow axis in the righthand portion of the loop of FIG. 2 (and conversely the slow axis in the lefthand portion becomes the fast axis in the righthand portion). The fiber loop (L) is polarization dispersive, i.e. the propagation speed of light within the fiber is different for polarization in alignment with the fast axis and for polarization that is orthogonal to the fast axis of propagation, i.e. that is aligned with the slow axis of the fiber. It is necessary to eliminate the effects of polarization dispersion, which is achieved by using two equivalent lengths of fiber having polarization-maintaining axes A1 and A2 in a mutually orthogonal disposition so as to cancel polarization dispersion over the length of the loop L.

To make the system independent of the polarization of the switched signal, the polarization of the control signal that is injected into the loop L by the coupler C2 on the control input fiber F3 is injected at 45° to the two orthogonal axes A1 and A2. In the same manner as before, the effects of polarization dispersion cancel.

D8=L. E. Adams et al. (1994), "All-optical clock recovery using a mode-locked figure-eight laser with a semiconductor non-linearity", Electron. Lett., Vol. 30, No. 20, pp. 1696–1697, Sep. 29, 1994. That document teaches another embodiment of a mode-locked laser for all-optical clock recovery.

D9=T. Widdowson et al. (1994), "Soliton shepherding: all-optical active soliton control over global distances", Elect. Lett., 30 (12), pp. 990–991. That document teaches the use of a Kerr type optical modulator apparatus for a "shepherding" application to eliminate soliton jitter in very long distance optical telecommunications links. The term "shepherding" designates time guidance of solitons for time-multiplexed very high data rate systems. The modulator of the invention advantageously replaces the 13 km dispersion shift fiber described in that document.

OBJECTS AND SUMMARY OF THE INVENTION

An object of the invention is to mitigate the problems and drawbacks of the prior art. An object of the invention is to provide a Kerr type optical modulator whose operation is independent of the polarization of the light signal and of the pump light injected into said modulator. Another object of the invention is to provide an all-optical clock recovery circuit that does not need polarization adjustments to be performed, and that is insensitive or little sensitive to environmental effects under normal operating conditions, with operation thereof remaining independent of polarization.

To this end, the invention provides a Kerr type optical modulator, comprising an even number 2i>2, $\underline{i}$ integer, of segments (T1, T2, T3, T4, . . . ) of polarization-maintaining fiber having two neutral propagation axes, said segments having equivalent optical lengths and being optically interconnected by 2i-1 splices (E1, E2, E3, . . . ) at 2i-1 locations, said neutral propagation axes of the fiber being turned through 90° at each splice, in such a manner as to compensate polarization dispersion.

In a particularly advantageous embodiment, the invention provides a Kerr type optical modulator, comprising an even number 2i>2, $\underline{i}$ integer, of segments (T1, T2, T3, T4, . . . ) of polarization-maintaining fiber having two neutral propagation axes, said segments having equivalent optical lengths and being optically interconnected by 2i-1 splices (E1, E2, E3, . . . ) at 2i-1 locations, said neutral propagation axes of the fiber being turned through 90° at each splice, except for the splice in the middle of the loop, i.e. the i-th splice (E1, E2), with the i-th splice including a mode converter, said mode converter comprising a polarization-maintaining optical demultiplexer (C30) and a polarization-maintaining optical multiplexer (C40), together with first and second optical paths (F$\lambda_s$, F$\lambda_c$) interconnecting them to convey said first and second wavelengths ($\lambda_s$, $\lambda_c$), said optical paths being implemented by polarization-maintaining fiber, and wherein the neutral axes of said first path (F$\lambda_s$) are turned through 90°, while the neutral axes of said second path (F$\lambda_c$) are not turned.

The invention also relates to an all-optical clock recovery circuit operating by active mode locking of a fiber loop laser, said loop laser including a length of optical fiber (R), said loop (R) having a signal input via a first optical coupler (C10) for injection of a first input optical signal characterized in part by a first wavelength ($\lambda_s$) and a signal output and a second optical coupler (C20) constituting a clock signal output characterized in part by a second wavelength ($\lambda_c$), said second signal being extracted from said loop (R) via the fiber (F3), wherein said optical fiber loop (R) comprises an even number 2i>2, i integer, of segments (T1, T2, T3, T4, ... ) of polarization-maintaining fiber having two neutral propagation axes, said segments having equivalent optical lengths and being optically interconnected by 2i-1 splices (E1, E2, E3, ... ) at 2i-1 locations, said neutral propagation axes of the fiber being turned through 90° at each splice.

In a particularly advantageous embodiment, the invention provides an all-optical clock recovery circuit operating by active mode locking of a fiber loop laser, said loop laser including a length of optical fiber (R), said loop (R) having a signal input via a first optical coupler (C10) for injection of a first input optical signal characterized in part by a first wavelength ($\lambda_s$) and a signal output and a second optical coupler (C20) constituting a clock signal output characterized in part by a second wavelength ($\lambda_c$), said second signal being extracted from said loop (R) via the fiber (F3), wherein said optical fiber loop (R) comprises an even number 2i>2, i integer, of segments (T1, T2, T3, T4, ... ) of polarization-maintaining fiber having two neutral propagation axes, said segments having equivalent optical lengths and being optically interconnected by 2i-1 splices (E1, E2, E3, ... ) at 2i-1 locations, said neutral propagation axes of the fiber being turned through 90° at each splice, except for the splice in the middle of the loop, i.e. the i-th splice (E1, E2), with the i-th splice including a mode converter, said mode converter comprising a polarization-maintaining optical demultiplexer (C30) and a polarization-maintaining optical multiplexer (C40), together with first and second optical paths (F$\lambda_s$, F$\lambda_c$) interconnecting them to convey said first and second wavelengths ($\lambda_s$, $\lambda_c$), said optical paths being implemented by polarization-maintaining fiber, and wherein the neutral axes of said first path (F$\lambda_s$) are turned through 90°, while the neutral axes of said second path (F$\lambda_c$) are not turned.

In a particular embodiment, said optical demultiplexer and multiplexer (C30, C40) are wavelength-selective polarization-maintaining optical couplers that respectively separate and combine said first and second optical signals at said first and second wavelengths ($\lambda_s$, $\lambda_c$).

In a variant, there are four segments, and there are three splices.

In a preferred embodiment, the lengths (L1, L2, L3, L4, ... ) of said 2i segments (T1, T2, T3, T4, ... ) of polarization-maintaining fiber are selected so that the non-linear phase shift induced by control on one of the neutral axes and integrated over the i first segments (the first half of the loop T1, T2), is equal to the non-linear phase shift induced by the control on the other axis and integrated over the last i segments (the second half of the loop T3, T4).

The circuit of the invention can advantageously be used in applications that are already known, but in which performance has until now been compromised by the sensitivity of prior art all-optical clock recovery circuits to the environment. Thus, the invention also proposes:

a regenerator for soliton optical signals and including the all-optical clock recovery circuit of the invention;

an optical demultiplexer including an all-optical clock recovery circuit of the invention;

an optical demodulator including an all-optical clock recovery circuit of the invention;

a fiber loop laser including an optical modulator of the invention; and a soliton transmission system including a clock recovery circuit using a mode-locked laser including a Kerr modulator of the invention.

BRIEF DESCRIPTION OF THE DRAWINGS

The invention and its various characteristics and advantages will be better understood in the light of the following detailed description and the accompanying drawings, in which:

FIG. 5 is a diagram of a soliton signal transmission system of the invention including a regenerator of the invention together with a plurality of in-line optical amplifiers and a plurality of guiding filters;

FIG. 6 is a diagram of one example of an all-optical circuit of the invention for recovering a clock from an optical signal, operating on the known principles of mode locking a fiber ring laser and including a Kerr modulator of the invention; and FIG. 7 is a diagram of an example of a mode converter suitable for use in the embodiment of FIG. 6.

The drawings are given as non-limiting examples for the purpose of illustrating the principles of the invention. In all of the figures, the same references identify the same elements, and for reasons of clarity the drawings are not always to scale.

MORE DETAILED DESCRIPTION

Figure 1:
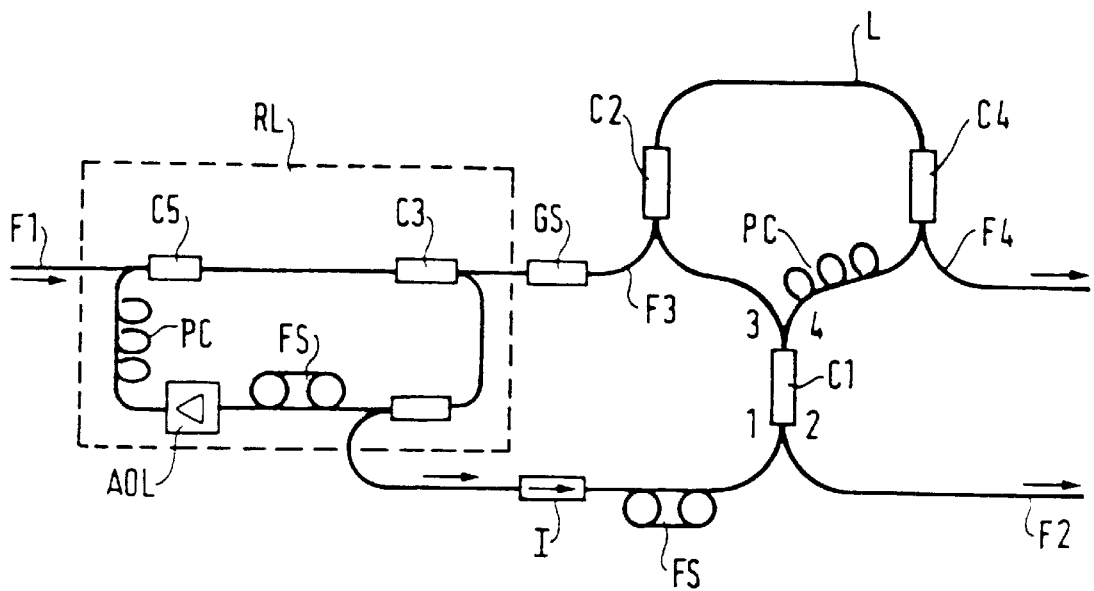
FIG. 1, described above, is a diagram of a soliton regenerator that operates by switching a clock signal by means of a NOLM, and known in the prior art from document D3.
Figure 3:
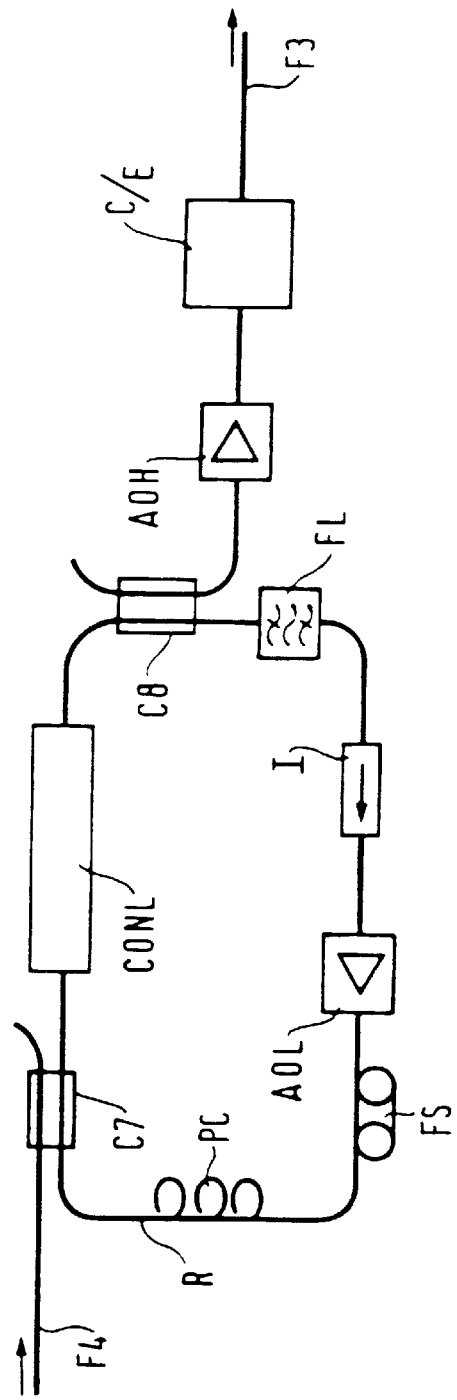
FIG. 3 is a diagram of one example of an all-optical circuit for recovering a clock from an optical signal using known principles of mode-locking a fiber ring laser.

FIG. 3 is a diagram of an all-optical circuit for recovering a clock from an optical signal by means of the known principles of mode locking a fiber ring laser. The overall structure of the circuit in FIG. 3 is conventional. The soliton type optical signal taken from the sample-taking coupler C3 of FIG. 5 propagates along optical fiber F4 to a fiber loop R to which it is coupled by coupler C7. The fiber loop R and the various optical components to be found therein form a ring laser, as already described with reference to FIG. 1 (referenced RL) or as described in document D8 by L. E. Adams et al. The ring laser comprises optical amplification means AOL, an optical isolator I for one-way operation, optical filter means FL centered on the wavelength of the laser light, and non-linear optical coupling means CONL enabling amplitude and/or phase non-linearities to be obtained as a function of the amplitude of the electric field of the light travelling along the fiber R. These non-linear means CONL may, for example, be a Kerr optical modulator in accordance with the present invention.

The ring laser may operate continuously (CW) in the absence of a soliton signal injected via the coupler C7. In contrast, as soon as a bit train is injected via the coupler C7, it causes mode locking of the ring laser at the bit rate of the signal, providing the length of the laser cavity is an integer multiple of the space taken up by one bit. This length can be adjusted by means of a mechanical device FS for adjusting the transit time so that it is indeed an integer multiple of the space occupied by one bit in the ring. The device FS is controlled by control means (not shown) which operate by feedback to keep the length of the ring constant.

These pulses can then be taken off via optical coupler C8 to provide a clock signal substantially without time jitter. To make this signal easy to use for synchronous modulation, FIG. 3 shows a second optical amplifier AOH and compression and/or expansion means for imparting the desired waveform to the pulses from the ring laser (amplitude, duration, waveform rise and fall time, . . . ). The raw pulses are relatively narrow, and it may be desirable to widen them before using them. Thus, the clock pulses delivered on optical fiber F3 are optimized for the intended use.

Figure 4:
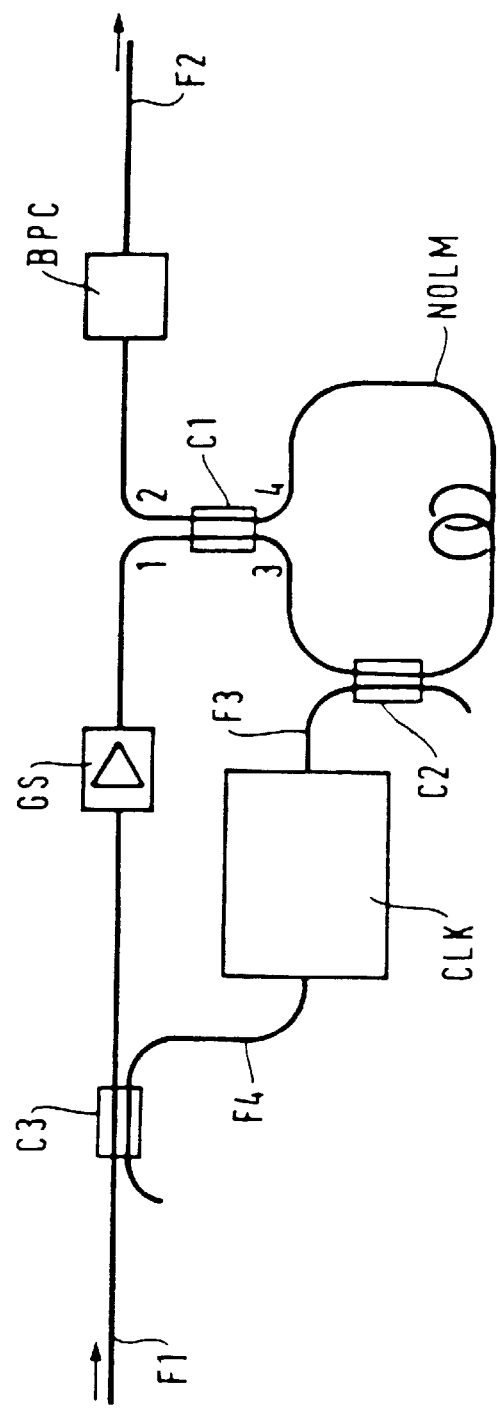
FIG. 4 is a diagram of an embodiment of a synchronous soliton modulator circuit of document D1 and in which the modulator is a NOLM.

FIG. 4 is a diagram showing an embodiment as described in document D1 of apparatus for synchronously modulating solitons, in which the modulator is a NOLM. In the apparatus shown in FIG. 4, the soliton type optical signal to be regenerated arrives via input optical fiber F1 where an optical coupler C3 takes a portion of the signal to extract a clock signal therefrom by the clock recovery means CLK. Thereafter, the clock recovery means apply said optical clock signal to the control input of the NOLM via coupler C2. The soliton signal is always at the same wavelength $\lambda_s$. The wavelength $\lambda_h$ of the clock signal is preferably slightly different from that of the soliton signal $\lambda_s$, to enable filtering to block the clock at the output from the apparatus by means of a bandpass filter BPC whose passband is centered on the wavelength $\lambda_s$ of the soliton.

Downstream from the take-off coupler C3, the soliton signal continues to propagate along the input optical fiber F1 to the input port 1 of the coupler C1 of the NOLM. In a variant, an optical amplifier GS may be located upstream from the NOLM to compensate for line losses suffered by the soliton since the last time it was amplified or regenerated.

The NOLM operates in similar manner to that described above with reference to FIG. 1. Solitons reaching the port 1 of the NOLM coupler C1 are thus modulated by the clock signal applied to the control input F3 via the control coupler C2. The transit times of the clock pulses and of the solitons over their respective paths must be adjusted as in the FIG. 1 apparatus to enable said signals to be synchronized when travelling around the NOLM.

The soliton signal is thus modulated by the envelope of the clock signal, thus making it possible to perform amplitude modulation of the solitons. The amplitude modulation is found to be sufficient to reduce or even eliminate Gordon-Haus jitter at the output from the regenerator.

FIG. 5 is a diagram showing a soliton signal transmission system in accordance with the invention comprising a clock recovery circuit of the invention together with a plurality of in-line optical amplifiers and a plurality of guiding filters. The guiding filters compress the spectrum width of the solitons, but they remove energy from the solitons in so doing. That is why the gain of the in-line amplifiers needs to be greater than the line losses to which the solitons are subjected over the optical fibers (LF1, LF2, . . . ) between the amplifiers (G1, G2, G3, . . . ). By reducing the spectrum width of the solitons, time jitter is also reduced by the guiding filters, as explained in document D10=L. F. Mollenauer et al. (1992), "The sliding frequency guiding filter: an improved form of soliton jitter control", Optics Letters, Vol. 17, No. 22, pp. 1575–1577, Nov. 15, 1992.

An object of the invention is to mitigate the drawbacks of the prior art and in particular to enable the optical modulator, and thus circuits including such a modulator, such as a mode-locked fiber loop laser and an all-optical circuit for recovering a clock by locking the modes of such a laser, to be insensitive to vibration and to temperature variations in the surroundings.

Figure 2:
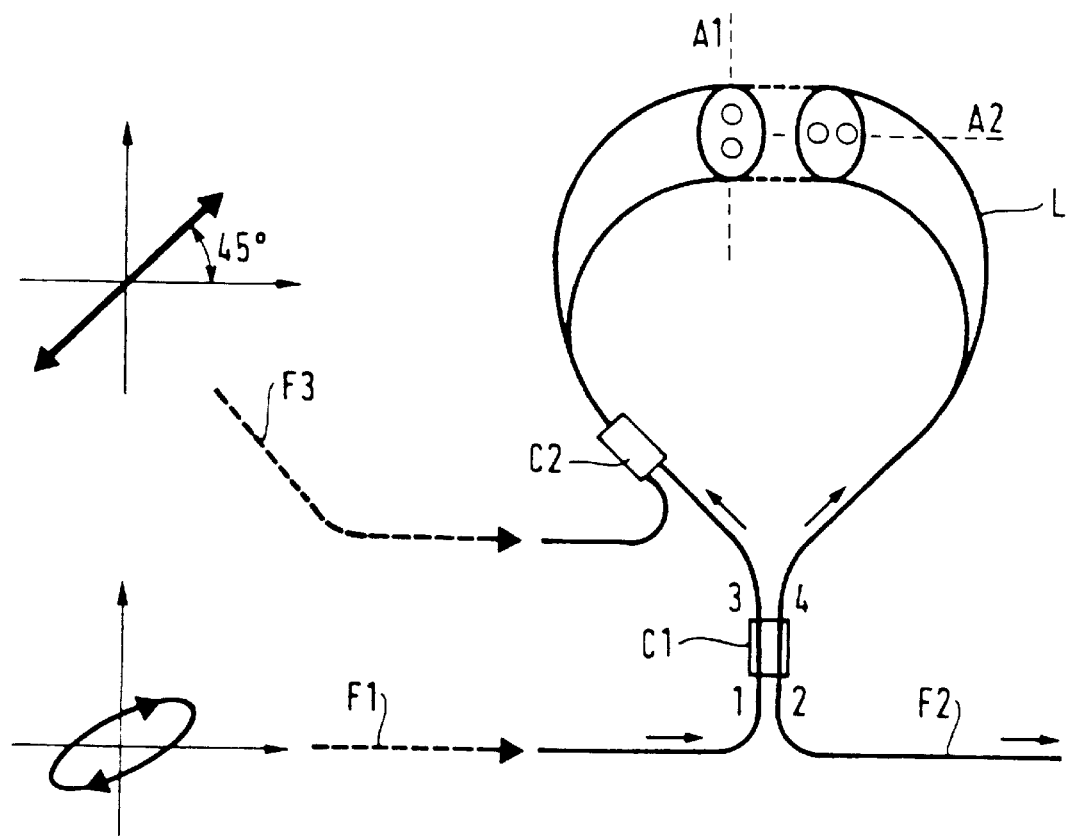
FIG. 2, described above, is a diagram of a NOLM switch that is insensitive to the polarization of the signal to be switched, and known in the prior art from document D7.

The circuit of the invention, an example of which is shown diagrammatically in FIG. 6, operates in similar manner to the NOLMs described above with reference to FIG. 2. Like the NOLM of FIG. 2, the laser of the invention is built up from a plurality of polarization-maintaining fiber segments. According to the invention, the number of segments is an even number 2i, where i is an integer greater than 1. As shown in FIG. 6, it is necessary to have at least four segments (T1, T2, T3, T4) of equivalent optical lengths (respectively L1, L2, L3, L4). These four segments (T1, T2, T3, T4) are optically interconnected by three splices (E1, E2, E3) at three locations. At the first and third splices (E1, E3), the neutral propagation axes of the polarization-maintaining fiber are turned through 90°, as explained above with reference to the sole splice of FIG. 2.

In a preferred variant of the invention, a mode converter is inserted in the loop L at the second splice E2 between the segments T2 and T3. The mode converter shown in FIG. 7 comprises an optical demultiplexer C30 and an optical multiplexer C40, together with two polarization-maintaining optical paths (F$\lambda_s$ and F$\lambda_c$) interconnecting them. The demultiplexer C30 separates the two optical signals present on its input (i.e. $\lambda_c$ and $\lambda_s$) applying them respectively to said two optical paths (F$\lambda_s$, F$\lambda_c$). On the path F$\lambda_s$ conveying the input signal $\lambda_s$, there is a splice E4 with the neutral propagation axes of the polarization-maintaining fiber being rotated through 90°. On the other path, i.e. F$\lambda_c$, there is no rotation of the axes. Said multiplexer C40 then recombines the two signals $\lambda_s$ and $\lambda_c$.

By way of example, such demultiplexer and multiplexer devices (C30 and C40) can be made by using three polarization-maintaining fibers, with a dichroic filter and a polarization-maintaining optical coupler. Such a device is commercially available from the Canadian company JDS FITEL Inc., Nepean, Ontario, under catalog No. WD1555-ALL5JM1, for example. It is also possible, in the near future, that such a component will be implemented in integrated optical technology.

There is no need to make arrangements for injecting the input optical signal $\lambda_s$ into the laser via the coupler C10 with its polarization axis oriented in any particular direction relative to the polarization-maintaining axes A1 and A2 in the fiber loop R. Operation of the device is thus insensitive to the polarization of the two signals $\lambda_s$ and $\lambda_c$ and no adjustment is required, thus constituting a major advantage over the prior art embodiments described in documents D1, D2, and D3.

Compared with the device of document D4, implementation is considerably simplified since the polarizations of the two optical signals $\lambda_s$ and $\lambda_c$ are not critical as they are in D4. In addition, the mode converter of the invention is relatively insensitive to ambient temperature. The circuit of D4 requires temperature regulation to operate properly. Also, the laser of D4 does not compensate polarization dispersion of the signals propagating around the loop R.

Thus, the circuit of the invention is capable of operating properly and reproducibly, being insensitive to variations in the surroundings such as temperature, acceleration, vibration, etc. Naturally, the circuit operates with signals $\lambda_s$, $\lambda_c$ of polarizations that are arbitrary, unknown, and possibly incapable of being controlled. Also, compensation for polarization dispersion is performed automatically without adjustment.

To describe more precisely a preferred embodiment of the invention, it is appropriate to explain the meaning of the concept of "equivalent" optical lengths for the segments (T1, T2, T3, T4) in the present context. For this purpose, account needs to be taken of the optical losses suffered by optical signals propagating along the segments of the loop R and through the splices connecting them together, since polarization dispersion also depends on the non-linear phase shifts (Kerr effect) upstream and downstream from the mode converter being equal, and thus on the amplitude of the signals.

To give an example of how the lengths of the segments are calculated, various assumptions are made to simplify the description. An even number of segments is selected, 2i=4. Within each pair of segments, the lengths are selected to be identical (L1=L2, L3=L4) so as to compensate polarization dispersion within each pair. As shown in FIG. 6, the optical coupler C10 is located close to the beginning of the first segment T1. A signal injected via the coupler C10 is subjected successively to losses in T1, E1, T2, E2, T3, E3, and T4. This signal is therefore at its weakest in the last segment T4, so the non-linear effects will likewise be at their weakest in said segment. To obtain effects of the same magnitude in the last segment T4 as in the first segment T1, it is therefore necessary for the length L4 of the last segment T4 to be greater than the length L1 of the first segment T1.

It is assumed that fiber attenuation has a constant value in all of the segments, e.g. $\alpha$=0.23 dB/km, and the losses in the splices E1, E2, and E3 are written respectively P1, P2, and P3.

Taking the condition that the non-linear phase shift induced by control on one of the neutral axes and integrated over the first $i$ segments (the first half of the loop, T1, T2) is equal to the non-linear phase shift induced by control on the other axis and integrated over the last $i$ segments (the second half of the loop, T3, T4), the following can be written:

$$(1-e^{-\alpha L1})/\alpha + (P1 \times e^{-\alpha L1}) \times (1-e^{-\alpha L1})/\alpha - P1 \times P2 \times (e^{-2\alpha L1})(1-e^{-\alpha L4})/\alpha + P1 \times P2 \times P3x \, [e^{-(2L1+L4)}][1-e^{-\alpha L4}]/\alpha$$

This means that L1 and L4 must satisfy the following relationship:

$$1+(P1-1)e^{-\alpha L1}+P1 \times e^{-2\alpha L1}=[P1 \times P2 \times e^{-\alpha L1}][1+(P3-1)e^{-\alpha L4}+P3 \times e^{-2\alpha L4})]$$

Insertion losses in the mode converter of an optical path without rotation of the polarization axes are negligible compared with the terms retained in the above equations.

The Kerr optical modulator of the invention, and apparatuses including such a modulator can include a greater (even) number of segments, but that increases the complexity of the apparatus, and also the losses due to the splices.

The person skilled in the art will know how to manipulate this concept to adapt it to numerous applications in various embodiments without thereby going beyond the ambit of the present invention, as defined by the following claims.

I claim:

1. A Kerr type amplitude modulator of optical signals, comprising an even number 2i<2 of segments of polarization-maintaining fiber having two neutral propagation axes, where i is an integer, said segments having equivalent optical lengths and being optically interconnected by 2i-1 splices at 2i-1 locations, said neutral propagation axes of the fiber being turned through 90° at each splice, in such a manner as to compensate polarization dispersion.

2. A fiber loop laser including a Kerr modulator according to claim 1.

3. A soliton transmission system including a clock recovery circuit using a mode lock laser including a Kerr modulator according to claim 1.

4. A Kerr type amplitude modulator of optical signals comprising:
   an even number 2i>2 of segments of polarization-maintaining fiber having two neutral propagation axes, where i is an integer, said segments having equivalent optical lengths and being optically interconnected by 2i-1 splices at 2i-1 locations to form an optical fiber loop, said neutral propagation axes of the fiber being turned through 90° at each splice, except for an i-th splice in the middle of the loop with the i-th splice including a mode converter, said mode converter comprising a polarization-maintaining optical demultiplexer and a polarization-maintaining optical multiplexer, together with first and second optical paths interconnecting them to convey first and second optical signals having first and second wavelengths respectively, said optical paths being implemented by polarization-maintaining fiber, and wherein the neutral axes of said first path are turned through 90°, while the neutral axes of said second path are not turned.

5. An optical modulator according to claim 4, wherein said optical demultiplexer and multiplexer are wavelength-selective polarization-maintaining optical couplers that respectively separate and combine said first and second optical signals at said first and second wavelengths.

6. An optical modulator according to claim 4, wherein said segments of polarization-maintaining fiber are four in number, and said splices are three in number.

7. An optical modulator according to claim 6, wherein the lengths of said four segments of polarization-maintaining fiber are selected such that the relative phase shift between the polarization components of said first and second optical signals having said first and second wavelengths and integrated over the first half of the loop is equal to the relative phase shift as integrated over the second half of the loop.

8. A fiber loop laser including a Kerr modulator according to claim 4.

9. A soliton transmission system including a clock recovery circuit using a mode lock laser including a Kerr modulator according to claim 4.

10. An all-optical clock recovery circuit operating by active mode locking of a fiber loop laser comprising:
    said loop laser including a length of optical fiber, said loop having a signal input via a first optical coupler for injection of a first input optical signal characterized in part by a first wavelength and a signal output and a second optical coupler constituting a clock signal output characterized in part by a second wavelength, said clock signal being extracted from said loop via the fiber, wherein said optical fiber loop comprises an even number 2i<2 of segments of polarization-maintaining fiber having two neutral propagation axes, where i is an integer,
    said segments having equivalent optical lengths and being optically interconnected by 2i-1 splices at 2i-1 locations, said neutral propagation axes of the fiber being turned through 90° at each splice.

11. An all-optical clock recovery circuit operating by active mode locking of a fiber loop laser comprising:

said loop laser including a length of optical fiber, said loop having a signal input via a first optical coupler for injection of a first input optical signal characterized in part by a first wavelength and a signal output and a second optical coupler constituting a clock signal output characterized in part by a second wavelength, said clock signal being extracted from said loop via the fiber, wherein said optical fiber loop comprises an even number 2i<2 of segments of polarization-maintaining fiber having two neutral propagation axes where i is an integer, said segments having equivalent optical lengths and being optically interconnected by 2i-1 splices at 2i-1 locations, said neutral propagation axes of the fiber being turned through 90° at each splice, except for an i-th splice in the middle of the loop, with the i-th splice including a mode converter, said mode'converter comprising a polarization-maintaining optical demultiplexer and a polarization-maintaining optical multiplexer, together with first and second optical paths interconnecting them to convey said first and second wavelengths, said optical paths being implemented by polarization-maintaining fiber, and wherein the neutral axes of said first path are turned through 90°, while the neutral axes of said second path are not turned.

12. A soliton optical regenerator comprising a clock recovery circuit for recovering a clock from an input soliton optical signal, and a regenerator circuit responsive to said input soliton optical signal and said recovered clock for providing a regenerated soliton optical signal, wherein said clock recovery circuit comprises an all-optical clock recovery circuit operating by active mode locking of a fiber loop laser, said clock recovery circuit comprising:

said loop laser including a length of optical fiber, said loop having a signal input via a first optical coupler for injection of a first input optical signal characterized in part by a first wavelength and a signal output and a second optical coupler constituting a clock signal output characterized in part by a second wavelength, said clock signal being extracted from said loop via the fiber, wherein said optical fiber loop comprises an even number 2i <2 of segments of polarization-maintaining fiber having two neutral propagation axes, where i is an integer.

said segments having equivalent optical lengths and being optically interconnected by 2i-1 splices at 2i-1 locations, said neutral propagation axes of the fiber being turned through 90° at each slice.

13. An optical demultiplexer including a clock recovery circuit for recovering a clock from an input optical signal, and a demultiplexer circuit responsive to said input optical signal and said recovered clock for providing a demultinlexed optical signal, wherein said clock recovery circuit comprises an all-optical clock recovery circuit operating by active mode locking of a fiber loop laser, said clock recovery circuit comprising:

said loop laser including a length of optical fiber, said loop having a signal input via a first optical coupler for injection of a first input optical signal characterized in part by a first wavelength and a signal output and a second optical coupler constituting a clock signal output characterized in part by a second wavelength, said clock signal being extracted from said loop via the fiber, wherein said optical fiber loop comprises an even number 2i<2 of segments of polarization-maintaining fiber having to neutral propagation axes, where i is an integer, said segments having equivalent optical lengths and being optically interconnected by 2i-1 splices at 2i-1 locations, said neutral propagation axes of the fiber being turned through 90° at each splice.

14. An optical demodulator including a clock recovery circuit for recovering a clock from an input optical signal, and a demodulator circuit responsive to said input optical signal and said recovered clock for providing a demodulated optical signal, wherein said clock recovery circuit comprises an all-optical clock recovery circuit operating by active mode locking of a fiber loop laser, said clock recovery circuit comprising:

said loop laser including a length of optical fiber, said loop having a signal input via a first optical coupler for injection of a first input optical signal characterized in part by a first wavelength and a signal output and a second optical coupler constituting a clock signal output characterized in part by a second wavelength, said clock signal being extracted from said loop via the fiber, wherein said optical fiber loop comprises an even number 2i<2 of segments of polarization-maintaining fiber having two neutral propagation axes, where i is an integer, said segments having equivalent optical lengths and being optically interconnected by 2i-1 splices at 2i-1 locations, said neutral propagation axes of the fiber being turned through 90° at each splice.

15. A Kerr type amplitude modulator of optical signals, comprising an even number 2i<2 of segments of polarization-maintaining fiber having two neutral propagation axes, where i is an integer, said segments having equivalent optical lengths and being optically interconnected by 2i-1 splices at 2i-1 locations, said neutral propagation axes of the fiber being turned through 90° at each splice except for the i-th splice which includes a mode converter.

* * * * *